(12) United States Patent
Shimizu et al.

(10) Patent No.: US 8,652,008 B2
(45) Date of Patent: Feb. 18, 2014

(54) POWER TRANSMISSION APPARATUS

(75) Inventors: Tetsuya Shimizu, Anjo (JP); Tomomi Ishikawa, Okazaki (JP); Kazunori Ishikawa, Toyota (JP)

(73) Assignee: Aisin Aw Co., Ltd., Anjo (JP)

( * ) Notice: Subject to any disclaimer, the term of this patent is extended or adjusted under 35 U.S.C. 154(b) by 673 days.

(21) Appl. No.: 12/909,888

(22) Filed: Oct. 22, 2010

(65) Prior Publication Data

US 2011/0124459 A1    May 26, 2011

(30) Foreign Application Priority Data

Nov. 24, 2009   (JP) ................................. 2009-266220

(51) Int. Cl.
*F16H 61/00*    (2006.01)
(52) U.S. Cl.
USPC ......................................................... 477/143
(58) Field of Classification Search
None
See application file for complete search history.

(56) References Cited

FOREIGN PATENT DOCUMENTS

| JP | A-61-282132 | 12/1986 |
|---|---|---|
| JP | A-11-063204 | 3/1999 |
| JP | A-2001-058518 | 3/2001 |
| JP | A-2001-165286 | 6/2001 |
| JP | A-2001-165287 | 6/2001 |
| JP | A 2008-180303 | 8/2008 |
| JP | A-2009-133486 | 6/2009 |

OTHER PUBLICATIONS

Jan. 11, 2011 International Search Report issued in PCT/JP2010/068847 (with translation).

*Primary Examiner* — Erin D Bishop
(74) *Attorney, Agent, or Firm* — Oliff PLC

(57) ABSTRACT

A power transmission apparatus mounted on a vehicle is provided with a motor that transmits power from the motor to an axle through a friction engagement element. The power transmission apparatus is further configured with a mechanical pump that pressure-feeds a fluid to a fluid pressure servo for the friction engagement element, and an electric pump that pressure-feeds the fluid to the fluid pressure servo of the friction engagement element. Furthermore, a lubrication supply passage is configured to connect to a flow passage extending from the electric pump to the fluid pressure servo. A first valve switches between opening and closing the lubrication supply passage such that, during a stop of the motor, so as to supply the fluid to the fluid pressure servo when in a driving position, and to the component to be lubricated when shifted to a neutral position.

6 Claims, 5 Drawing Sheets

|   |     | C1 | C2 | C3 | B1 | B2  | F1 |
|---|-----|----|----|----|----|-----|----|
| R |     |    |    | ○  |    | ○   |    |
| D | 1st | ○  |    |    |    | (○) | ○  |
|   | 2nd | ○  |    |    | ○  |     |    |
|   | 3rd | ○  | ○  |    |    |     |    |
|   | 4th |    | ○  |    | ○  |     |    |

(○): ENGINE BRAKE IN OPERATION

D POSITION

N POSITION

POWER TRANSMISSION APPARATUS

INCORPORATION BY REFERENCE

The disclosure of Japanese Patent Application No. 2009-266220 filed on Nov. 24, 2009 including the specification, drawings and abstract is incorporated herein by reference in its entirety.

BACKGROUND OF THE INVENTION

The present invention relates to a power transmission apparatus that is mounted to a vehicle provided with a motor, and transmits power from the motor to an axle through a friction engagement element.

DESCRIPTION OF THE RELATED ART

According to related art, this type of power transmission apparatus conventionally has a hydraulic pump that is driven by power from an engine; a manual shift valve that operates in accordance with a shift operation; a solenoid valve whose input port is connected to the hydraulic pump through the manual shift valve; a selector valve that is disposed in an oil passage connecting an output port of the solenoid valve and a friction engagement element (clutch), and that is formed as a two-position electromagnetic valve selecting between a first position for opening the oil passage and at a second position for closing the oil passage; and an electromagnetic pump that directly supplies discharge pressure to the clutch (see Japanese Patent Application Publication No. JP-A-2008-180303 for example).

SUMMARY OF THE INVENTION

Generally, a pressurized oil from the hydraulic pump is used for lubricating a differential gear and other gear mechanisms, and mechanical portions, such as a bearing, in addition to engaging the clutch above. Here, when considering the towing of a vehicle with a shift lever in a neutral position, lubricant oil cannot be supplied to the above components to be lubricated, because the hydraulic pump does not operate during an engine stop. Thus, if the vehicle is continuously towed for a long time, lubrication may become insufficient.

It is a main object of the present invention to suppress insufficient lubrication in a power transmission apparatus including a mechanical pump that operates with power from a motor and supplies a fluid to components to be lubricated while the motor is stopped.

The power transmission apparatus of the present invention employs the following means to achieve the main object described above.

A power transmission apparatus according to a first aspect of the present invention is a power transmission apparatus that is mounted to a vehicle provided with a motor, and transmits power from the motor to an axle through a friction engagement element. The power transmission apparatus includes: a mechanical pump that uses the power from the motor to pressure-feed a fluid to a fluid pressure servo for the friction engagement element and pressure-feed the fluid to a component to be lubricated; an electric pump that receives a supply of electricity and pressure-feeds the fluid to the fluid pressure servo of the friction engagement element; a lubrication supply passage that is connected to a flow passage extending from the electric pump to the fluid pressure servo and through which the fluid in the flow passage is supplied to the component to be lubricated; and a first valve that switches between opening and closing the lubrication supply passage. In the power transmission apparatus, during a stop of the motor, the first valve closes the lubrication supply passage so as to supply the fluid from the electric pump to the fluid pressure servo when shifted to a driving position, and opens the lubrication supply passage so as to supply the fluid from the electric pump to the component to be lubricated shifted to a neutral position.

The power transmission apparatus according to the first aspect of the present invention is provided with the electric pump that pressure-feeds the fluid to the fluid pressure servo for the friction engagement element; the lubrication supply passage that is connected to the flow passage extending from the electric pump to the fluid pressure servo and through which the fluid in the flow passage is supplied to the component to be lubricated; and the first valve that switches between opening and closing the lubrication supply passage. While the motor is stopped, the first valve closes the lubrication supply passage in order to allow the fluid to be supplied from the electric pump to the fluid pressure servo for the friction engagement element when shifted to the driving position, and opens the lubrication supply passage in order to allow the fluid to be supplied from the electric pump to the component to be lubricated when shifted to the neutral position. Thus, even if the vehicle is towed while in the neutral position with the motor stopped and the mechanical pump thus stopped, insufficient lubrication can be suppressed from occurring. Further, if the electric pump is driven while in the driving position during a stop of the mechanical pump accompanying a stop of the motor, the fluid pressure can be applied to the fluid pressure servo for the friction engagement element. Consequently, the friction engagement element can be quickly engaged at the next start of the motor, and thus power transmission can be quickly started. Here, the term "motor" includes an electric motor, in addition to an internal combustion engine capable of an automatic stop and an automatic start. The term "friction engagement element" includes a brake that connects one rotary system to a fixing system, such as a case, in addition to a clutch that connects two rotary systems. Further, the term "electric pump" includes a normal electric pump that is driven by power from the electric motor and generates the fluid pressure, and an electromagnetic pump that generates the fluid pressure by reciprocating a movable portion using an electromagnetic force and a biasing force of a spring.

In the power transmission apparatus according to a second aspect of the present invention thus configured, the first valve may be incorporated in a shift valve that opens a flow passage extending from the mechanical pump to the fluid pressure servo when shifted to the driving position, and closes the flow passage when shifted to the neutral position. In this configuration, the apparatus can be made more compact compared to an apparatus in which the first valve is provided separately from the shift valve. The power transmission apparatus according to a third aspect of the present invention may further include a second valve that is disposed in a flow passage extending from the shift valve to the fluid pressure servo, and switches between opening and closing the flow passage, and the shift valve may drain the fluid in the fluid pressure servo when shifted to the neutral position in a state where the second valve is stuck with the flow passage closed. In this configuration, even if the switching valve is stuck for any reason, it is possible to more reliably suppress power transmission from the motor to the axle that is unexpected by a driver. The power transmission apparatus according to a fourth aspect of the present invention may further include a regulator valve that regulates a fluid pressure from the shift valve and supplies the regulated fluid pressure to the fluid pressure servo, and the regulator valve and the second valve may be disposed so that the fluid pressure from the shift valve is supplied to the fluid pressure servo sequentially through the regulator valve and the second valve. In the power transmission apparatus according to a fifth aspect of the present invention, the lubrication supply passage may include a first flow passage through which the fluid from the shift valve is supplied to the component to be lubricated via a first check valve, and a second flow passage that branches off from the first flow passage at a point upstream of the first check valve and through which the fluid is drained via a second check valve, and a valve opening pressure of the first check valve is set smaller than a valve opening pressure of the second check valve. In this configuration, the fluid pressure-fed from the electric pump can be smoothly supplied to the component to be lubricated, and excess fluid pressure generated in the fluid pressure servo can be drained.

The power transmission apparatus according to a sixth aspect of the present invention may further include a control device that controls the electric pump so that, when shifted to the neutral position during a stop of the motor, the fluid is supplied from the electric pump to the component to be lubricated accompanied by an intermittent driving in which a driving period and a stop period are alternately repeated. In this configuration, the electric pump can be efficiently driven with a limited battery capacity, whereby a good lubricating condition can be maintained as long as possible.

DETAILED DESCRIPTION OF THE EMBODIMENT

Next, an embodiment of the present invention will be described.

Figure 1:
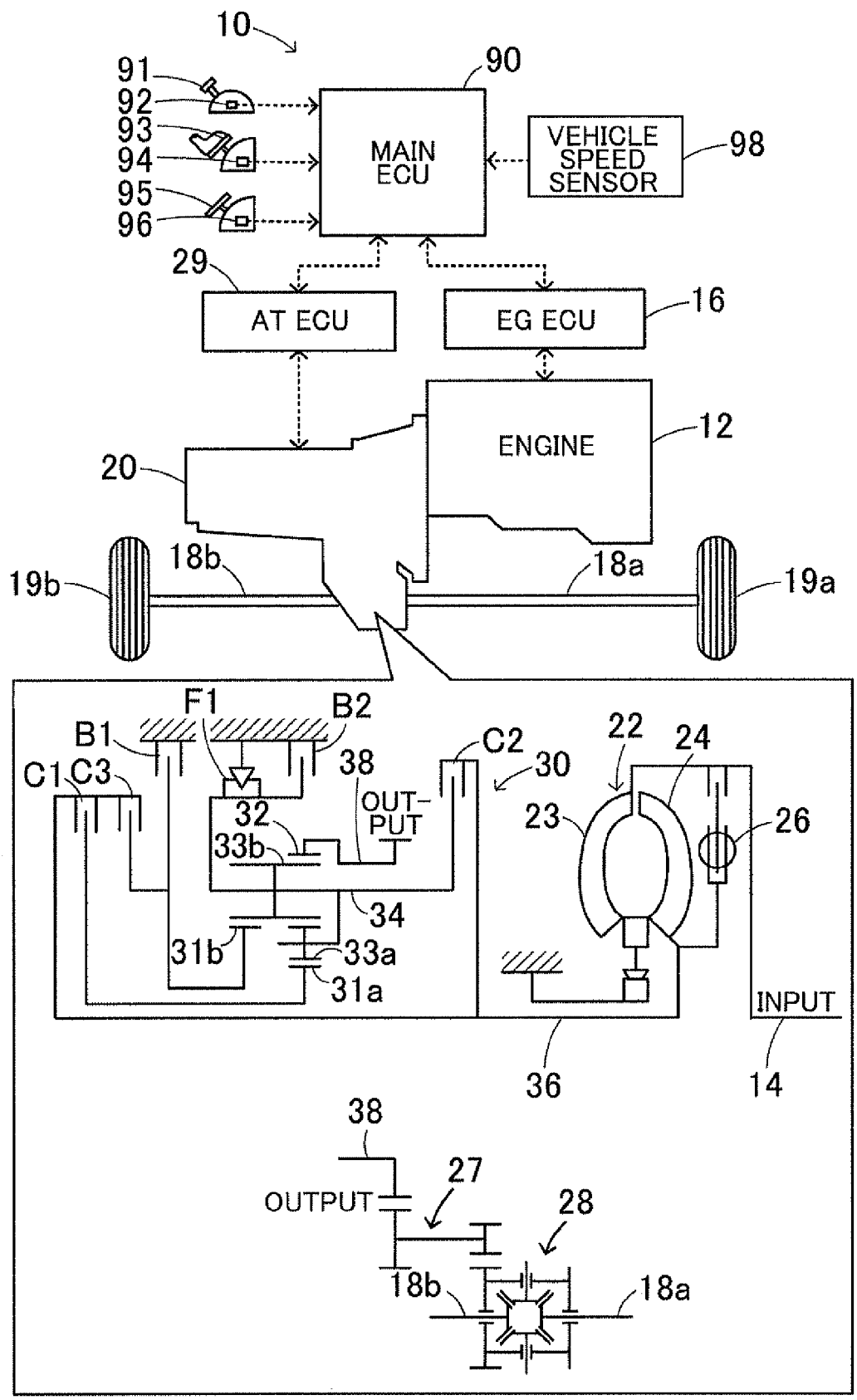
FIG. 1 is a structural diagram showing an outline of the configuration of a vehicle 10 mounted with a power transmission apparatus 20 serving as an embodiment of the present invention.
Figures 2, 3:
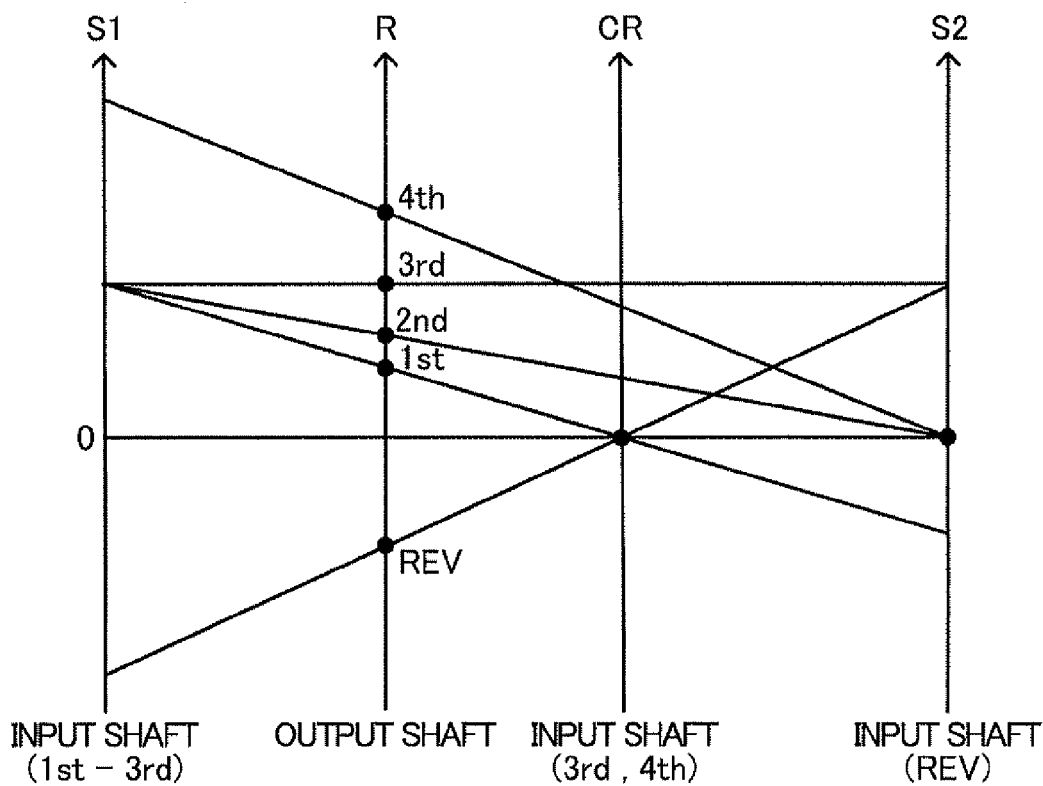
FIG. 2 is an operation chart for an automatic speed change mechanism 30.
FIG. 3 is a collinear diagram showing relationships among rotational speeds of rotational elements in the automatic speed change mechanism 30.

FIG. 1 is a structural diagram that shows an outline of the configuration of a vehicle 10 mounted with a power transmission apparatus 20 serving as an embodiment of the present invention. FIG. 2 is an operation chart for an automatic speed change mechanism 30.

As shown in the drawings, the power transmission apparatus 20 of the embodiment is configured to be mounted to the vehicle 10, which is a FF (front-engine, front-wheel-drive) type vehicle, for example. The power transmission apparatus 20 includes a torque converter 22 with a lock-up clutch, the automatic speed change mechanism 30, and an AT ECU 29. The torque converter 22 transmits power output from an engine 12 that operates under a control by an engine ECU (EG ECU) 16, while amplifying torque. The automatic speed change mechanism 30 includes an input shaft 36 to which the power is input from the torque converter 22, and an output shaft 38 connected to axles 18a, 18b of respective vehicle wheels 19a, 19b. The automatic speed change mechanism 30 changes a speed of the power input to the input shaft 36 and transmits the power to the output shaft 38 at the changed speed. The AT ECU 29 controls the entire apparatus. The vehicle 10 of the embodiment includes a main ECU 90 that controls the entire vehicle, including the engine 12 and the power transmission apparatus 20. The main ECU 90, through mutual communication, receives from and transmits to the EG ECU 16 and the AT ECU 29 control signals and data relating to operational conditions of the engine 12 and the power transmission apparatus 20. Note that the main ECU 90 is input with a shift position SP from a shift position sensor 92 that detects an operation position of a shift lever 91; an accelerator pedal position Ace from an accelerator pedal position sensor 94 that detects a depression amount of an accelerator pedal 93; a brake switch signal BSW from a brake switch 96 that detects depression of a brake pedal 95; and a vehicle speed V from a vehicle speed sensor 98. Although not shown in the drawings, the vehicle 10 also includes a battery that supplies electricity to a starter motor that cranks the engine and accessories (such as a solenoid) provided for the power transmission apparatus 20 of the embodiment so as to drive the starter motor and the accessories.

The torque converter 22 includes a pump impeller 23, which is connected to a crankshaft 14 of the engine 12; and a turbine runner 24, which is connected to the input shaft 36 of the automatic speed change mechanism 30 and disposed facing the pump impeller 23. The torque converter 22 transmits torque by the pump impeller 23 converting engine torque into a flow of operation oil, and the turbine runner 24 converting this flow of operation oil into torque for the input shaft 36. The torque converter 22 also has a built-in lock-up clutch 26, and engagement of the lock-up clutch 26 directly connects the crankshaft 14 of the engine and the input shaft 36 of the automatic speed change mechanism 30 so that engine torque is directly transmitted.

The automatic speed change mechanism 30 has a Ravigneaux type planetary gear mechanism; three clutches C1, C2, C3; two brakes B1, B2; and a one-way clutch F1. The Ravigneaux type planetary gear mechanism has two sun gears 31a, 31b with external teeth; a ring gear 32 with internal teeth; a plurality of short pinion gears 33a that mesh with the sun gear 31a; a plurality of long pinion gears 33b that mesh with the sun gear 31b and the plurality of short pinion gears 33a, and also mesh with the ring gear 32; and a carrier 34 that is connected to and also rotatably and revolvably holds the plurality of short pinion gears 33a and the plurality of long pinion gears 33b. The sun gear 31a is connected to the input shaft 36 through the clutch C1. The sun gear 31b is connected to the input shaft 36 through the clutch C3, and the sun gear 31b is permitted to rotate or held stationary by the brake B1. The ring gear 32 is connected to the output shaft 38. The carrier 34 is connected to the input shaft 36 through the clutch C2. The carrier 34 is restricted to rotate in one direction by the one-way clutch F1, and permitted to rotate or held stationary by the brake B2, which is provided in parallel with the one-way clutch F1. The power output to the output shaft 38 is transmitted to the axles 18a, 18b through a gear mechanism 27 and a differential gear 28.

As shown in the operation chart of FIG. 2, the automatic speed change mechanism 30 can switch among first to fourth forward speeds and one reverse speed by combinations of engaging and disengaging the clutches C1 to C3 and the brakes B1, B2. Note that, FIG. 3 is a collinear diagram showing relationships among rotational speeds of sun gears S1, S2, a ring gear R, and a carrier CR at each shift speed in the automatic speed change mechanism 30.

Figure 4:
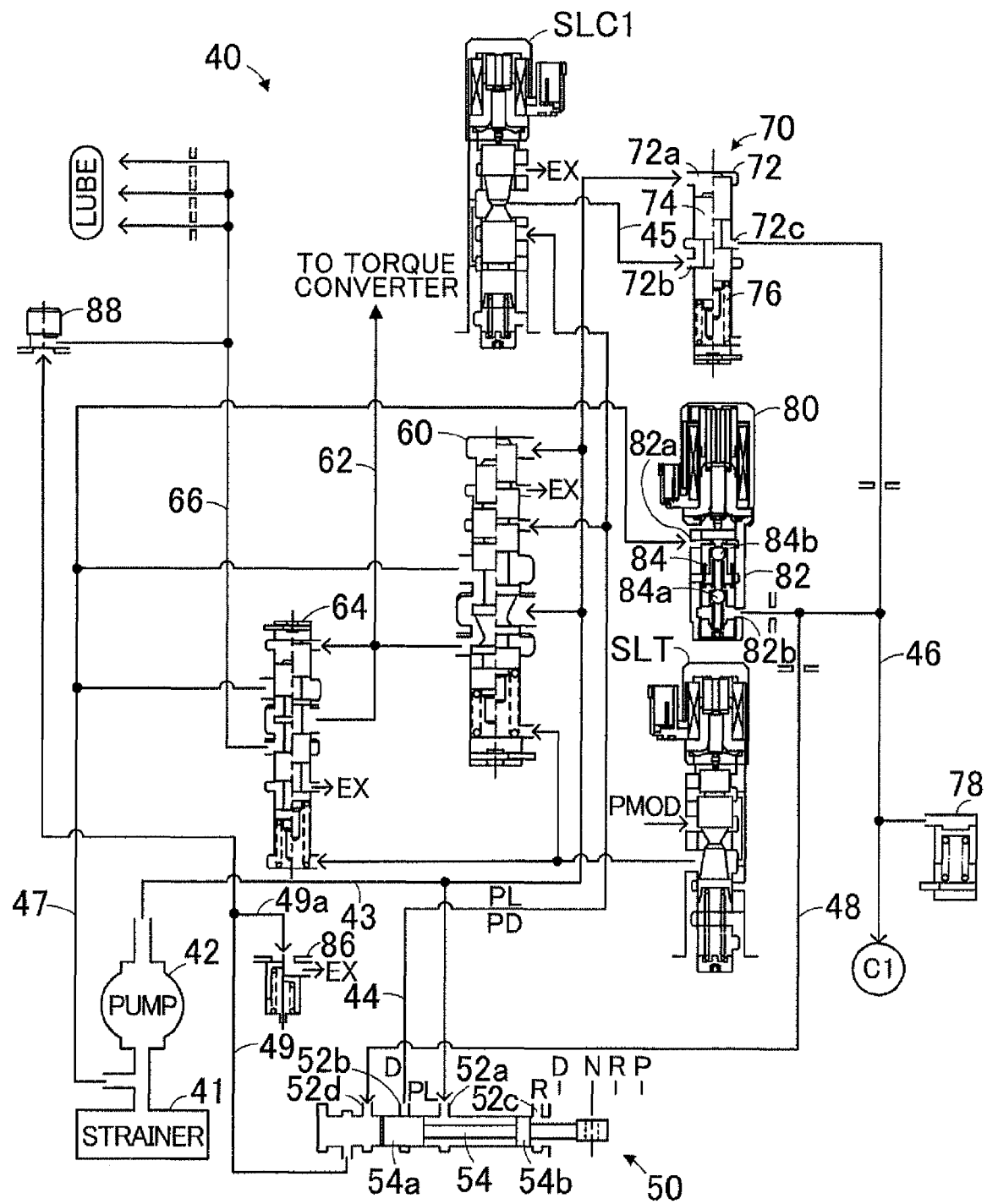
FIG. 4 is a structural diagram showing an outline of the configuration of a hydraulic circuit 40.

Engaging and disengaging of the clutches C1 to C3 and the brakes B1, B2 of the automatic speed change mechanism 30 is performed by a hydraulic circuit 40. FIG. 4 is a structural diagram that shows an outline of the configuration of the hydraulic circuit 40. As shown in the drawings, the hydraulic circuit 40 includes a mechanical oil pump 42, a primary regulator valve 60, a secondary regulator valve 64, a linear solenoid SLT, a manual valve 50, a linear solenoid SLC1, a switching valve 70, an electromagnetic pump 80, an accumulator 78, and the like. The mechanical oil pump 42 suctions the operation oil through a strainer 41 from an oil pan (not shown) with the power from the engine 12, and pressure-feeds the suctioned operation oil to a pump oil passage 43. The primary regulator valve 60 regulates hydraulic pressure in the pump oil passage 43 to generate a line pressure PL, and such pressure regulation is accompanied by supplying a part of the operation oil in the pump oil passage 43 to an oil passage 62 connected to the torque converter 22. The secondary regulator valve 64 regulates the hydraulic pressure in the oil passage 62 to generate a secondary pressure PS, and such pressure regulation is accompanied by supplying a part of the operation oil in the oil passage 62 to a lubrication oil passage (LUBE) 66. The linear solenoid SLT regulates a modulator pressure PMOD generated by a modulator valve (not shown) based on the line pressure PL, and outputs the regulated pressure as a signal pressure so as to drive the primary regulator valve 60 and the secondary regulator valve 64. The manual valve 50 is provided with an input port 52a that is connected to the pump oil passage 43 and input with the line pressure PL, a Drive position output port (D port) 52b, a Reverse position output port (R port) 52c, and connects and disconnects the input port 52a and the output ports 52b, 52c in accordance with the operation of the shift lever 91. The linear solenoid SLC1 includes an input port connected to the D port 52b through a D port oil passage 44, and regulates the hydraulic pressure from the input port and outputs the regulated pressure from an output port. The switching valve 70 is driven based on the line pressure PL, and switches between connection and disconnection of an output port oil passage 45 connected to the output port of the linear solenoid SLC1 and a clutch oil passage 46 connected to the clutch C1 The electromagnetic pump 80 has a suction check valve 84a and a discharge check valve 84b built into a cylinder 82. The electromagnetic pump 80 also has a suction port 82a connected to a suction oil passage 47 that is connected to the strainer 41, and a discharge port 82b that is connected to the clutch oil passage 46. The electromagnetic pump 80 suctions the operation oil through the suction port 82a and discharges the operation oil from the discharge port 82b as a piston 84 reciprocates in the cylinder 82 by an electromagnetic force. The accumulator 78 is connected to the clutch oil passage 46 for the clutch C1. Note that FIG. 4 only shows the hydraulic system for the clutch C1, and does not show those for the other clutches C2, C3 or for the brakes B1, B2 because they are not central to the present invention. These hydraulic systems may be configured using common linear solenoids or the like.

Here, the operation oil supplied to the lubrication oil passage 66 is supplied to mechanical portions provided in the automatic speed change mechanism 30, such as the clutches C1 to C3, the brakes B1, B2, the gear mechanism 27, the differential gear 28, and a bearing for rotatably supporting each rotating shaft. After lubricating these portions, the operation oil returns again to the oil pan.

The switching valve 70 is formed from a sleeve 72, a spool 74 that slides in an axial direction inside the sleeve 72, and a spring 76 that biases the spool 74. The sleeve 72 is formed with a signal pressure input port 72a input with the line pressure PL as a signal pressure; an input port 72b connected to the output port of the linear solenoid SLC1; and an output port 72c connected to the clutch oil passage 46. In the switching valve 70, when the line pressure PL is input to the signal pressure input port 72a, the spool 74 overcomes a biasing force of the spring 76 due to the line pressure PL and moves to a position shown on the left hand side of the valve in the drawing, so that the input port 72b is connected to the output port 72c. When the line pressure PL is not input to the signal pressure input port 72a, the biasing force of the spring 76 moves the spool 74 to a position shown on the right hand side of the valve in the drawing, so that the input port 72b and the output port 72c are disconnected from each other.

The manual valve 50 is formed with an input port 52a, a D port 52b, and an R port 52c that communicate with a generally cylindrical space formed inside a valve body. A spool 54 provided with two lands 54a, 54b slides inside the space in accordance with the operation of the shift lever 91 so as to open and close the ports. In other words, when shifted to the D position, the space created by a clearance between the two lands 54a, 54b of the spool 54 connects the input port 52a and the D port 52b and the land 54b disconnects the input port 52a and the R port 52e. When the shift lever 91 is shifted to the N position, the land 54a disconnects the input port 52a and the D port 52b, and the land 54b also disconnects the input port 52a and the R port 52c. When the shift lever 91 is shifted to the R position, the space created by the clearance between the two lands 54a, 54b of the spool 54 connects the input port 52a and the R port 52c, and the land 54a disconnects the input port 52a and the D port 52b.

Figure 5A:
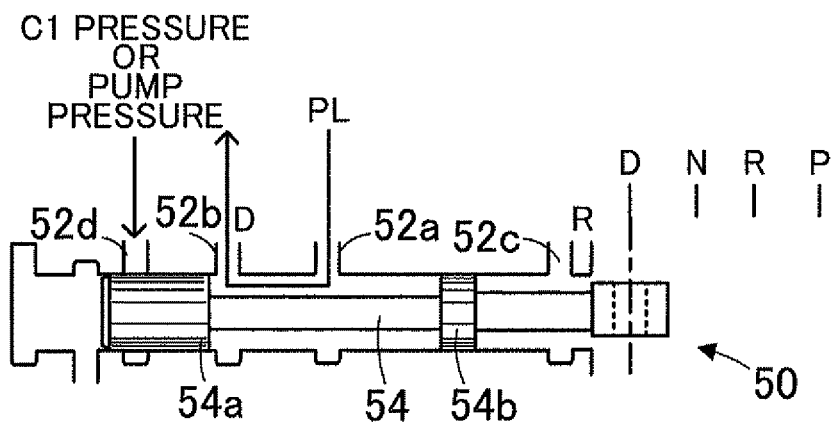
FIGS. 5A and 5B are explanatory diagrams showing how a manual valve 50 operates.
Figure 5B:
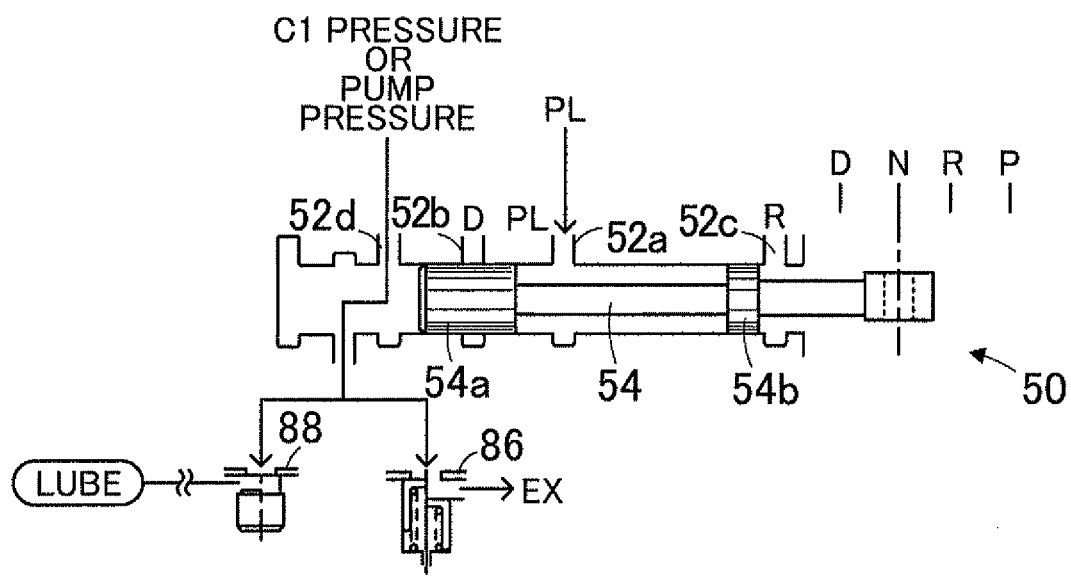

The manual valve 50 also includes a second input port 52d that connects a relay oil passage 49 and a branch oil passage 48 that branches off from the clutch oil passage 46. A check valve 88 is provided in the relay oil passage 49 for supplying the operation oil to the lubrication oil passage 66, and a check valve 86 is provided in a branch oil passage 49a for draining the operation oil into the oil pan. The branch oil passage 49a branches off from the relay oil passage 49 at a point upstream of the check valve 88. The check valves 86, 88 are designed so that a valve opening pressure P1 of the check valve 88 is smaller than a valve opening pressure P2 of the check valve 86. FIGS. 5A and 5B show how the manual valve 50 operates. As shown in FIGS. 5A and 5B, when the shift lever 91 is shifted to the D position, the second input port 52d is closed by the land 54a, and thus the branch oil passage 48 and the relay oil passage 49 are disconnected from each other. When the shift lever 91 is shifted to the N position, the second input port 52d is opened and thus the branch oil passage 48 and the relay oil passage 49 are connected to each other. Therefore, when the shift lever 91 is in the D position, the hydraulic pressure applied to the clutch C1 is maintained, and when the shift lever 91 is in the N position, the operation oil is supplied to the lubrication oil passage 66 and is drained into the oil pan by the hydraulic pressure applied to the clutch C1. As described above, since the valve opening pressure P1 of the check valve 88 is set smaller than the valve opening pressure P2 of the check valve 86, the operation oil is supplied only to the lubrication oil passage 66 when the hydraulic pressure applied to the clutch C1 is the valve opening pressure P1 or larger but smaller than the valve opening pressure P2; a part of the operation oil is drained and the remainder thereof is supplied to the lubrication oil passage 66 when the hydraulic pressure applied to the clutch C1 is the valve opening pressure P2 or larger.

Furthermore, when the vehicle 10 of the embodiment thus configured is traveling with the shift lever 91 in the Drive (D) position, which is the driving position, the engine 12 is automatically stopped when all preset automatic stop conditions, such as the vehicle speed V being a value of 0, the accelerator off, and the brake switch signal BSW on, are satisfied. Once the engine 12 is automatically stopped, if preset automatic start conditions, such as the brake switch signal BSW being off, are subsequently satisfied, the automatically stopped engine 12 is automatically started.

In the vehicle 10 of the embodiment, when the automatic stop conditions are satisfied and the engine 12 is thus automatically stopped, the mechanical oil pump 42 also stops accordingly. Thus, the line pressure PL is drained, and the switching valve 70 disconnects the output port (output port oil passage 45) of the linear solenoid SLC1 and the clutch C1 (clutch oil passage 46). When the shift lever 91 is in the D position, the second input port 52d of the manual valve 50 connected to the branch oil passage 48 is closed, Therefore, the hydraulic pressure can be applied to the clutch C1 by driving the electromagnetic pump 80. Then, when the stopped engine 12 is restarted because the automatic start conditions are satisfied, the mechanical oil pump 42 is accordingly activated. Thus, the line pressure PL is supplied, and the switching valve 70 connects the output port of the linear solenoid SLC1 and the clutch C1. In such case, the line pressure PL input through the D port 52b of the manual valve 50 is regulated by driving the linear solenoid SLC1 and supplied to the clutch C1, so that the clutch C1 becomes completely engaged and the vehicle starts moving. By driving the electromagnetic pump 80 so that hydraulic pressure is applied to the clutch C1 while the engine 12 is automatically stopped, the clutch C1 can be quickly engaged immediately after the engine 12 is automatically restarted. Therefore, the vehicle can smoothly start off.

Assuming that the vehicle 10 is unable to travel and requires towing, for example, normally the engine 12 is stopped, the shift lever 91 is shifted to the N position, and the mechanical oil pump 42 is also stopped. Therefore, the lubricant oil cannot be supplied from the mechanical pump 42 to mechanical portions such as the gear mechanism 27, the differential gear 28, and the bearings. This may result in insufficient lubrication of the mechanical portions mentioned above if the vehicle is continuously towed a long distance. In the embodiment, when the shift lever 91 is shifted to the N position, the second input port 52d of the manual valve 50 is opened, and the branch oil passage 48 connected to the clutch oil passage 46, and the relay oil passage 49 connected to the lubrication oil passage 66 are connected to each other. Therefore, the electromagnetic pump 80 whose discharge port 82b is connected to the clutch oil passage 46 is driven to discharge the operation oil. The discharged operation oil from the electromagnetic pump 80 is supplied to the components to be lubricated for lubrication thereof after sequentially flowing through the clutch oil passage 46, the branch oil passage 48, the second input port 52d of the manual valve 50, the relay oil passage 49, the check valve 88, and the lubrication oil passage 66. Accordingly, towing of the vehicle for a long time does not result in insufficient lubrication. Next, the operation of the electromagnetic pump 80 when the vehicle 10 is towed will be described.

Figure 6:
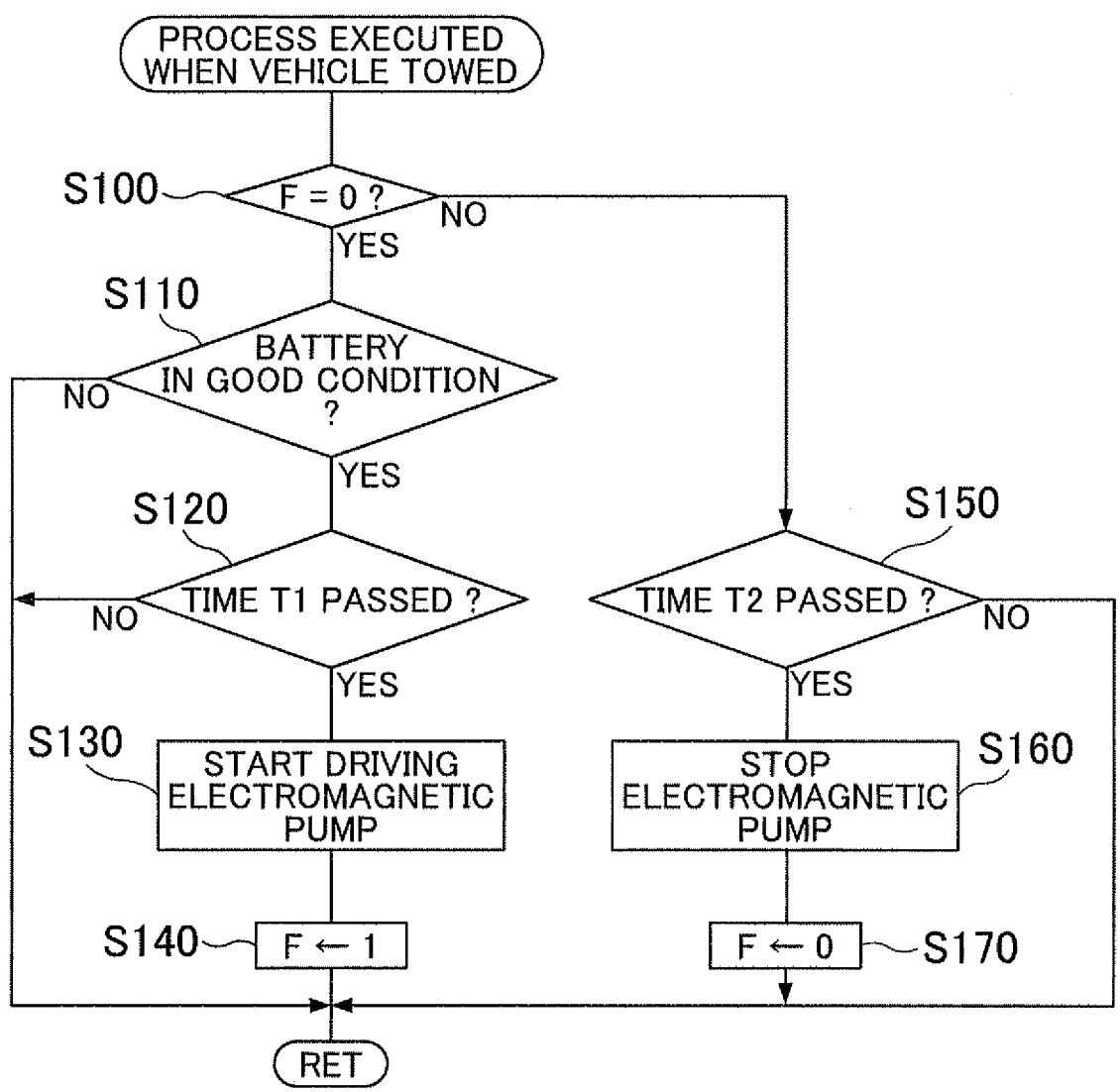
FIG. 6 is a flowchart showing an example of a process executed by an AT ECU 29 when a vehicle is towed.

FIG. 6 is a flowchart that shows an example of a process executed by the AT ECU 29 when the vehicle is towed. This process is repeatedly executed at predetermined time intervals when the shift lever 91 is shifted to the N position while the vehicle 10 is towed, for example, while the engine 12 is stopped. In the process executed when the vehicle is towed, the AT ECU 29 first examines a driving condition flag F that indicates whether the electromagnetic pump 80 is driven (S100). When the driving condition flag F is the value of 0, that is, when the electromagnetic pump 80 is stopped, the AT ECU 29 determines whether the battery is in a good condition (S110), Here, the determination as to whether the battery is in a good condition is made based on a determination as to whether a battery temperature is within an appropriate temperature range, whether an amount of remaining capacity of the battery is equal to or greater than a predetermined amount, or the like. When the battery condition is not good, the electromagnetic pump 80 cannot be driven and thus the process is terminated without executing any further process. On the other hand, when the battery condition is good, the AT ECU 29 determines whether a stop period T1 has elapsed (S120). When the stop period T1 has not elapsed, the process is terminated with the electromagnetic pump 80 stopped. When the stop period T1 has elapsed, the electromagnetic pump 80 starts to be driven (S130), the driving condition flag F is set to a value of 1 (S140), and the process is terminated. When it is determined at S100 that the driving condition flag F is the value of 1, that is, the electromagnetic pump 80 is being driven, the AT ECU 29 determines whether a driving period T2 has elapsed (S150). When the driving period T2 has not elapsed, the process is terminated with the electromagnetic pump 80 still driven. When the driving period T2 has elapsed, the electromagnetic pump 80 is stopped (S160), the driving condition flag F is set to the value of 0 (S170), and the process is terminated. As described herein, when the vehicle 10 is towed, an intermittent driving in which the stop period T1 and the driving period T2 are alternately repeated is performed so as to efficiently drive the electromagnetic pump 80 using the limited battery capacity, whereby a good lubricating condition can be maintained as long as possible.

Next, assuming that the penetration or the like of foreign matter while the shift lever 91 is in the D position and the engine 12 is automatically stopped causes a the spool 74 of the switching valve 70 to be stuck (locked) in the position in the right half region of the valve shown in FIG. 4. The output port of the linear solenoid SLC1 and the clutch C1 (clutch oil passage 46) are kept disconnected in such a condition. At this time, since the second input port 52d connected to the branch oil passage 48 that branches off from the clutch oil passage 46 is closed when the shift lever 91 is in the D position, the residual pressure is applied to the clutch C1. When the shift lever 91 is shifted from the D position to the N position, the second input port 52d of the manual valve 50 is opened, and the residual pressure applied to the clutch C1 is drained sequentially through the clutch oil passage 46, the branch oil passage 48, the second input port 52d, the relay oil passage 49, and the check valve 86, or supplied to the components to be lubricated from the relay oil passage 49 through the check valve 88 and the lubrication oil passage 66. Thus, even when the switching valve 70 is stuck, the power from the engine 12 can be prevented from being transmitted to the vehicle wheels 19a, 19b due to a failure to disengage the clutch C1 caused by the residual pressure applied to the clutch C1.

The power transmission apparatus 20 of the embodiment described above is provided with the electromagnetic pump 80 including the discharge port 82b connected to the clutch oil passage 46. Further, in the power transmission apparatus 20, the branch oil passage 48 is connected to the clutch oil passage 46, and the relay oil passage 49 is connected to the lubrication oil passage 66 through the check valve 88. The manual valve 50 is provided with the second input port 52d that disconnects the branch oil passage 48 and the relay oil passage 49 when the shift lever 91 is shifted to the D position, and connects the branch oil passage 48 and the relay oil passage 49 when the shift lever 91 is shifted to the N position. In this configuration, even when the engine 12 is stopped and the vehicle is towed with the shift lever 91 shifted to the N position, the lubricant oil can be supplied to the components to be lubricated, such as the gear mechanism 27, the differential gear 28, and the bearings, by driving the electromagnetic pump 80. Consequently, insufficient lubrication of the components to be lubricated can be suppressed. Moreover, the check valve 86 for draining the operation oil is provided in parallel to the check valve 88 in a passage branching off from the relay oil passage 49. Thus, the residual pressure applied to the clutch C1, which may occur when the spool 74 of the switching valve 70 is stuck due to the penetration or the like of foreign matter during an automatic stop of the engine 12 with the shift lever 91 in the D position, can be quickly drained when the shift lever 91 is shifted to the N position. Consequently, it is possible to suppress a transmission of power unexpected by the driver while in the N position.

In the power transmission apparatus 20 of the embodiment, the manual valve 50 connects and disconnects the branch oil passage 48 that branches off from the clutch oil passage 46 of the clutch C1 and the relay oil passage 49 connected to the lubrication oil passage 66. However, a dedicated switching valve may be separately provided.

In the power transmission apparatus 20 of the embodiment, the discharge port 82b of the electromagnetic pump 80 and the clutch oil passage 46 of the clutch C1 are directly connected. However, the discharge port 82b and the clutch oil passage 46 may be connected through the switching valve 70. In such case, the switching valve may be formed so as to disconnect the discharge port 82b and the clutch oil passage 46 when the line pressure PL is applied during operation of the engine 12, and connect the discharge port 82b and the clutch oil passage 46 when the line pressure PL is not applied during an automatic stop of the engine 12.

In the power transmission apparatus 20 of the embodiment, the switching valve 70 is driven using the line pressure PL. However, the switching valve 70 may be driven using a modulator pressure PMOD achieved by lowering the line pressure PL with a modulator valve (not shown). Alternatively, the line pressure PL or a modulator pressure may be supplied to the switching valve 70 through a solenoid valve so as to use the solenoid valve to drive the switching valve 70.

In the power transmission apparatus 20 of the embodiment, the linear solenoid SLC1 is configured as a regulator valve for direct control that directly controls the clutch C1 by generating an optimal clutch pressure based on the line pressure PL. However, the linear solenoid may be used as a valve for pilot control so as to drive a separate control valve to generate the clutch pressure to control the clutch C1.

Here, the correspondence relation will be described between main elements in the embodiment and main elements of the invention as listed in the Disclosure of the Invention. In the embodiment, the engine 12 corresponds to a "motor". The automatic speed change mechanism 30, the hydraulic circuit 40, and the like correspond to a "power transmission apparatus". The mechanical oil pump 42 corresponds to a "mechanical pump". The electromagnetic pump 80 corresponds to an "electric pump". The branch oil passage 46, the relay oil passage 49, and the lubrication oil passage 66 correspond to a "lubrication supply passage". The manual valve 50 corresponds to a "first valve". Further, the manual valve 50 also corresponds to a "shift valve". The switching valve 70 corresponds to a "second valve". The linear solenoid SLC1 corresponds to a "regulator valve". The relay oil passage 49 corresponds to a "first flow passage", and the branch oil passage 49a corresponds to a "second flow passage". The check valve 88 corresponds to a "first check valve", and the check valve 86 corresponds to a "second check valve". Further, the AT ECU 29 that executes the process when the vehicle is towed, which is shown in FIG. 6, corresponds to a "control device". Here, the "motor" is not limited to an internal combustion engine that outputs power from a hydrocarbon fuel such as gasoline or diesel oil, and may be any type of internal combustion engine such as a hydrogen engine, or any type of motor such as an electric motor other than the internal combustion engine, as long as the motor can output power. The "power transmission apparatus" is not limited to an apparatus that incorporates the four-speed automatic speed change mechanism 30 with first to fourth forward speeds, and may be an apparatus that incorporates an automatic transmission device with any number of shift speeds, such as three speeds, five speeds, or six speeds. Further, the "power transmission apparatus" is not limited to an apparatus that incorporates an automatic transmission device, and may be any configuration as long as the power from the motor is transmitted to an axle through a friction engagement element, such as the configuration in which the crankshaft 14 of the engine 12 is directly connected to the differential gear 28 and then to the axles 18a, 18b through the clutch. The "electric pump" is not limited to the electromagnetic pump 80, and may be any type of pump as long as the pump can operate to pressure-feed a fluid with a supply of electricity, such as an electric pump that pressure-feeds the operation oil by power supplied from the electric motor. Note that, with regard to the correspondence relation between the main elements of the embodiment and the main elements of the invention as listed in the Disclosure of the Invention, the embodiment is only an example for giving a specific description of a best mode for carrying out the invention explained in the Disclosure of the Invention. This correspondence relation does not limit the elements of the invention as described in the Disclosure of the Invention. In other words, the invention described in the Disclosure of the Invention shall be interpreted based on the description therein; and the embodiment is merely one specific example of the invention described in the Disclosure of the Invention.

The above embodiment was used to describe a best mode for carrying out the present invention. However, the present invention is not particularly limited to such an example, and may obviously be carried out using various embodiments without departing from the scope of the present invention.

The present invention may be used in the automobile industry and the like.

What is claimed is:

1. A power transmission apparatus that is mounted to a vehicle that includes a motor, the power transmission apparatus transmits power from the motor to an axle through a friction engagement element, the power transmission apparatus comprising:
   a mechanical pump that uses the power from the motor to pressure-feed fluid to a fluid pressure servo for the friction engagement element and pressure-feed fluid to a component to be lubricated;
   an electric pump that receives a supply of electricity and pressure-feeds fluid to the fluid pressure servo of the friction engagement element;
   a lubrication supply passage that is connected to a flow passage, the lubrication supply passage extending from the electric pump to the fluid pressure servo and fluid in the flow passage is supplied to the component to be lubricated via the lubrication supply passage; and
   a first valve that switches between opening and closing the lubrication supply passage, wherein during a stop of the motor, the first valve:
  closes the lubrication supply passage so as to supply fluid from the electric pump to the fluid pressure servo when a shift lever is shifted to a driving position, and
  opens the lubrication supply passage so as to supply fluid from the electric pump to the component to be lubricated when the shift lever is shifted to a neutral position.

2. The power transmission apparatus according to claim 1, wherein
the first valve is incorporated in a shift valve that opens a flow passage extending from the mechanical pump to the fluid pressure servo when the shift lever is shifted to the driving position, and closes the flow passage when the shift lever is shifted to the neutral position.

3. The power transmission apparatus according to claim 2, further comprising:
a second valve that is disposed in a flow passage extending from the shift valve to the fluid pressure servo, and the second valve switches between opening and closing the flow passage, wherein
the shift valve drains fluid in the fluid pressure servo when the shift lever is shifted to the neutral position in a state where the second valve is stuck with the flow passage closed.

4. The power transmission apparatus according to claim 3, further comprising:
a regulator valve that regulates a fluid pressure from the shift valve and supplies the regulated fluid pressure to the fluid pressure servo, wherein
the regulator valve and the second valve are disposed so that the fluid pressure from the shift valve is supplied to the fluid pressure servo sequentially through the regulator valve and the second valve.

5. The power transmission apparatus according to claim 3, wherein
the lubrication supply passage includes a first flow passage through which fluid from the shift valve is supplied to the component to be lubricated via a first check valve, and a second flow passage that branches off from the first flow passage at a point upstream of the first check valve and through which fluid is drained via a second check valve, and
a valve opening pressure of the first check valve is set smaller than a valve opening pressure of the second check valve.

6. The power transmission apparatus according to claim 1, further comprising:
a control device that controls the electric pump so that, when the shift lever is shifted to the neutral position during the stop of the motor, fluid is supplied from the electric pump to the component to be lubricated using an intermittent driving of the electric pump in which a driving period and a stop period of the electric pump are alternately repeated.

* * * * *